(12) United States Patent
Hayasaka et al.

(10) Patent No.: US 11,790,105 B2
(45) Date of Patent: Oct. 17, 2023

(54) SECRET SEARCH SYSTEM AND SECRET SEARCH METHOD

(71) Applicant: MITSUBISHI ELECTRIC CORPORATION, Tokyo (JP)

(72) Inventors: Kenichiro Hayasaka, Tokyo (JP); Yutaka Kawai, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 364 days.

(21) Appl. No.: 17/244,080

(22) Filed: Apr. 29, 2021

(65) Prior Publication Data

US 2021/0248262 A1 Aug. 12, 2021

Related U.S. Application Data

(63) Continuation of application No. PCT/JP2018/048531, filed on Dec. 28, 2018.

(51) Int. Cl.
  *G06F 21/62* (2013.01)
  *G06F 21/60* (2013.01)
  *G06F 21/78* (2013.01)

(52) U.S. Cl.
  CPC ........ *G06F 21/6227* (2013.01); *G06F 21/602* (2013.01); *G06F 21/78* (2013.01)

(58) Field of Classification Search
  CPC ..... G06F 21/6227; G06F 21/602; G06F 21/78
  See application file for complete search history.

(56) References Cited

U.S. PATENT DOCUMENTS

2019/0036679 A1    1/2019 Hirano et al.
2020/0159779 A1*   5/2020 Dong .................... H04L 9/0643

FOREIGN PATENT DOCUMENTS

WO    WO 2016/113878 A1    7/2016
WO    WO-2016113878 A1 *   7/2016    ............... G09C 1/00
(Continued)

OTHER PUBLICATIONS

Kawai et al., "SEPM: Efficient Partial Keyword Search on Encrypted Data", CANS 2015, 2015, LNCS 9476, pp. 75-91.
(Continued)

*Primary Examiner* — Ayoub Alata
(74) *Attorney, Agent, or Firm* — Birch, Stewart, Kolasch & Birch, LLP

(57) ABSTRACT

A secret search system is configured to generate a search key $TD_v$ in which a position of each character of a search character string is specified and set, and to search for, from among a plurality of encrypted tags $ET_x$ in which a position of each character of a character-string-to-be-searched is specified and set, an encrypted tag $ET_x$ corresponding to the generated se arch key $TD_v$. In particular, the secret search system is configured to search for an encrypted tag $ET_x$ including the search key $TD_v$ as a partial character string by setting a position t of each character in one of the search key $TD_v$ and the encrypted tags $ET_x$, setting a position −t of each character having a sign obtained by inverting a sign of the position t in the other thereof, and cancelling out, during the search, the position t and the position −t.

9 Claims, 15 Drawing Sheets

(56) References Cited

FOREIGN PATENT DOCUMENTS

| WO | WO 2017/122352 A1 | 7/2017 | | |
| WO | WO-2017122696 A1 * | 7/2017 | ........... | G06F 16/148 |
| WO | WO-2017126000 A1 * | 7/2017 | ............. | G06F 16/00 |

OTHER PUBLICATIONS

Okamoto et al., "Full Secure Unbounded Inner-Product and Attribute-Based Encryption", Asiacrypt 2012, 2012, LNCS 7658, pp. 349-366.

* cited by examiner

FIG. 1

CIPHERTEXT : $\vec{X} = (x_1, x_2, \ldots, x_n)$ $\updownarrow \quad \updownarrow \quad \quad \updownarrow$ KEY : $\vec{V} = (v_1, v_2, \ldots, v_n)$

FIG. 2

CIPHERTEXT : $\vec{X} = (x_1, x_2)$ $\updownarrow \quad \updownarrow$

KEY : $\vec{V} = (v_1, v_2, \ldots, v_n)$

FIG. 3

KEY
$$s_0 = \sum_{t \in Iv} s_t$$

$$k_0^* = (-s_0, \ldots)_{\mathbb{B}_0^*}$$

$$k_t^* = (\mu(t,-1), \delta v_t, s_t, \ldots)_{\mathbb{B}^*} \text{ for } t \in Iv$$

CIPHERTEXT
$$c_0 = (\ldots)_{\mathbb{B}_0}$$

$$c_t = (\sigma(1,t), \varpi x_t, \ldots)_{\mathbb{B}} \text{ for } t \in Ix$$

FIG. 4

KEY
$$s_0 = \sum_{t \in Iv} s_t, \quad 0 = \sum_{t \in Iv} \tau_t$$

$$k_0^* = (-s_0, \ldots)_{\mathbb{B}_0^*}$$

$$k_t^* = (\gamma' \beta^t \tau_t, \delta v_t, s_t, \ldots)_{\mathbb{B}^*} \text{ for } t \in Iv$$

CIPHERTEXT
$$c_0 = (\ldots)_{\mathbb{B}_0}$$

$$c_t = (\gamma \beta^{-t}, \varpi x_t, \ldots)_{\mathbb{B}} \text{ for } t \in Ix$$

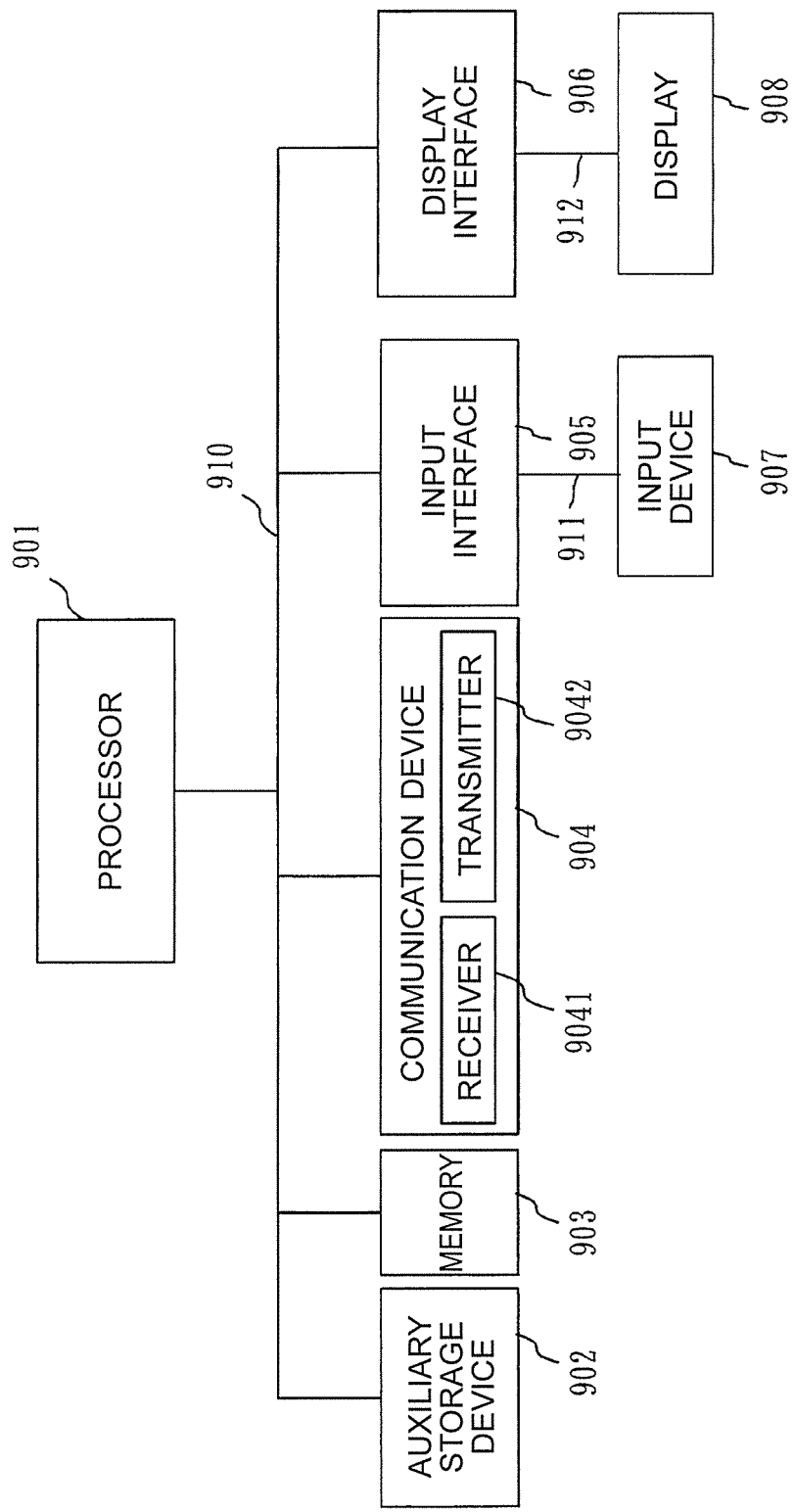

SECRET SEARCH SYSTEM AND SECRET SEARCH METHOD

CROSS REFERENCE TO RELATED APPLICATIONS

This application is a Continuation of PCT International Application No. PCT/JP2018/048531, filed on Dec. 28, 2018, which is hereby expressly incorporated by reference into the present application.

TECHNICAL FIELD

The present invention relates to a secret search system and a secret search method which are configured to search for, from among a plurality of character-strings-to-be-searched, a character-string-to-be-searched which includes a search character string.

BACKGROUND ART

Secret search is a technology that allows data to be searched while the data is still encrypted. Currently, cloud services are beginning to become widespread, and the use of cloud storage that can be used at low cost and without much trouble is becoming popular. Meanwhile, there is a risk of information leakage when data including private information, which is sensitive information that is to be handled very carefully, is managed in the cloud. Therefore, the data is required to be stored by encrypting the data. Secret search can achieve both security and convenience even for encrypted data because the search is performed without decrypting the data.

In the secret search, the search is implemented by using two encrypted keywords. The first keyword is a ciphertext of a keyword associated with the data (hereinafter referred to as "character-string-to-be-searched"), and is called an encrypted tag. The second keyword is a ciphertext of the keyword to be searched (hereinafter referred to as "search character string"), and is called a search key. When the data is registered, the encrypted data and the encrypted tag are registered in a storage server. At this point, the encrypted tag is held as an encryption index in association with the data to be associated or with an identifier of the data. In the secret search, the search is implemented without exposing data and keyword information by identifying the encrypted tag matching the search key transmitted by a searcher from the encryption index without decrypting the data.

For the secret search, there are known a method in which there is determined to be a match when a character-string-to-be-searched and the search character string are the same (hereinafter referred to as "exact match secret search"), and a method in which there is determined to be a match when the search character string is included in a character-string-to-be-searched (hereinafter referred to as "partial match secret search"). In the partial match secret search, it is possible to determine whether or not there is a match with a partial character string of the encrypted tag, and therefore the partial match secret search has a high level of convenience because a fuzzier search can be implemented than in the exact match secret search. One method of implementing the partial match secret search is to generate a ciphertext for each partial character string, for example, a character or a word. When a partial character string of the encrypted tag or the search key can be replaced or separated for further search, the information on the partial character string may be leaked by an attack, for example, a frequency analysis method. Therefore, there is required a mechanism for preventing a malicious third party from performing a search not intended by a registrant or a searcher.

In Patent Literature 1 and Patent Literature 2, there are shown methods capable of implementing a partial match secret search. However, the method of Patent Literature 1 uses the same key for generation of the encrypted tag and for generation of the search key, and therefore permissions are not separable. The method of Patent Literature 2 is more secure than Patent Literature 1 because different keys can be used for generating the encrypted tag and the search key, and a key having a different permission can be generated for each searcher. Further, the method of Patent Literature 2 prevents an unintended search by a malicious third party by embedding a variance in a ciphertext and introducing a secret key required for a partial match search (hereinafter referred to as "shift secret key").

In Non Patent Literature 1, there is shown a highly secure encryption method which can be used for partial match secret search. However, in Non Patent Literature 1, there is no description about a method for reducing an amount of search information transmitted from a searcher terminal to a search device by search key conversion like that of Patent Literature 2. The search key conversion of Patent Literature 2 is now described below.

As described above, in Patent Literature 2, a highly secure and flexible partial match secret search is implemented by separating the permissions. However, in Patent Literature 2, in order to determine whether or not the partial character string of the encrypted tag and the search key match, it is required to perform processing of matching a top character position in a partial character string of the encrypted tag with a top character position of the search key. This processing is called "search key conversion." Thus, in Patent Literature 2, it is required to perform search key conversion, and depending on the number of characters of the encrypted tag or search key, the search time may be significantly increased.

CITATION LIST

Patent Literature

[PTL 1] WO 2017/122352 A1
[PTL 2] WO 2016/113878 A1

Non Patent Literature

[NPL 1] Tatsuaki Okamoto and Katsuyuki Takashima, "Fully Secure Unbounded Inner-Product and Attribute-Based Encryption," Asiacrypt 2012, LNCS 7658, 2012, pp. 349-366

SUMMARY OF INVENTION

Technical Problem

As described above, in the search processing described in Patent Literature 2, the search key conversion processing requires a large amount of calculations, and therefore there is a problem in that when the determination regarding whether or not a partial character string of the encrypted tag matches the search key is used often, the search time becomes longer.

The present invention has been made to solve the problems described above, and it is an object of the present invention to obtain a secret search system and a secret search method which are capable of speeding up a search time while preventing an unintended search by a malicious third party.

Solution to Problem

According to one embodiment of the present invention, there is provided a secret search system including: a search key generation unit configured to generate a search key $TD_v$ in which a position of each character of a search character string is specified and set; an encrypted tag generation unit configured to generate encrypted tags $ET_x$ in which a position of each character of a character-string-to-be-searched is specified and set; and a search unit configured to search for, from among the encrypted tags $ET_x$, an encrypted tag $ET_x$ corresponding to the search key $TD_v$, wherein an index t indicating the position of each character is set in one of an element included in the search key $TD_v$ and an element included in the encrypted tags $ET_x$, and an index −t having a sign obtained by inverting a sign of the index t is set in the other of the element included in the search key $TD_v$ and the element included in the encrypted tags $ET_x$, and wherein the secret search system is configured to search for the encrypted tag $ET_x$ corresponding to the search key $TD_v$ by, during the search, adding the index t and the index −t set in the search key $TD_v$ and the encrypted tags $ET_x$ to cancel out the index t and the index −t.

According to one embodiment of the present invention, there is provided a secret search method including: a search key generation step of generating a search key $TD_v$ in which a position of each character of a search character string is specified and set; an encrypted tag generation step of generating a plurality of encrypted tags $ET_x$ in which a position of each character of a character-string-to-be-searched is specified and set; and a search step of searching for, from among the plurality of encrypted tags $ET_x$, an encrypted tag $ET_x$ corresponding to the search key $TD_v$, wherein an index t indicating the position of each character is set in one of an element included in the search key $TD_v$ and an element included in the plurality of encrypted tags $ET_x$, and an index −t having a sign obtained by inverting a sign of the index t is set in the other of the element included in the search key $TD_v$ and the element included in the plurality of encrypted tags $ET_x$, and wherein the encrypted tag $ET_x$ corresponding to the search key $TD_v$ is searched for by, during the search, adding the index t and the index −t set in the search key $TD_v$ and the plurality of encrypted tags $ET_x$ to cancel out the index t and the index −t.

Advantageous Effects of Invention

According to the secret search system and the secret search method of the present invention, it is possible to speed up the search time while preventing the unintended search by the malicious third party.

BRIEF DESCRIPTION OF DRAWINGS

FIG. 1 is an explanatory diagram of how an inner product is obtained in inner-product predicate encryption.

FIG. 2 is an explanatory diagram of how an inner product is obtained in the inner-product predicate encryption.

FIG. 3 is an explanatory diagram of a basic structure of the inner-product predicate encryption.

FIG. 4 is an explanatory diagram of a key technique to be used in a partial match secret search scheme in a first embodiment of the present invention.

FIG. 17 is a diagram for illustrating a hardware configuration example of the key generation device, the encrypted tag generation device, the search key generation device, an after-conversion search key generation device, and the search device in the first embodiment of the present invention.

DESCRIPTION OF EMBODIMENTS

First Embodiment

Figure 5:
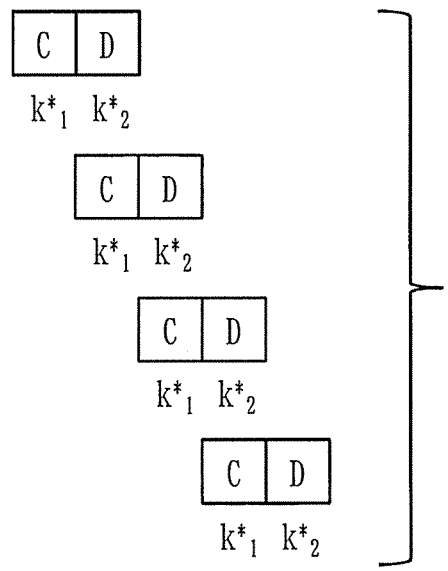
FIG. 5 is an explanatory diagram of an implementation example of the partial match secret search scheme in the first embodiment of the present invention.

A secret search system according to a first embodiment of the present invention is now described with reference to the drawings.

<Description of Notation>

First, description is made of notation used in the following description.

When "A" is a random value or distribution, Expression (1) represents that "y" is randomly selected from "A" in accordance with the distribution of "A." That is, in the following Expression (1), "y" is a random number.

$$y \xleftarrow{R} A \tag{1}$$

When "A" is a set, Expression (2) represents that "y" is uniformly selected from "A." That is, in the following Expression (2), "y" is a uniform random number.

$$y \xleftarrow{U} A \tag{2}$$

Expression (3) represents that "z" is set for "y," "y" is defined by "z," or "y" is substituted for "z."

$$y := z \tag{3}$$

When "a" is a constant, Expression (4) represents that a machine A or an algorithm A outputs "a" for an input x, and Expression (5) represents an example for a case in which a=1.

$$A(x) \to a \quad (4)$$

$$A(x) \to 1 \quad (5)$$

Expression (6) represents the field of an order q.

$$\mathbb{F}_q \quad (6)$$

Vector $\vec{x}$ represents a vector representation like that represented by the following Expression (7) in a finite field $\mathbb{F}_q$. The notation "→" means that "→" is added above the symbol written before the notation, and represents a vector.

$$(x_1, \ldots, x_n) \in \mathbb{F}_q^n \quad (7)$$

Expression (8) represents an inner product represented by Expression (10) of two vectors $\vec{x}$ and $\vec{v}$ represented by Expression (9).

$$\vec{x} \cdot \vec{v} \quad (9)$$

$$\left. \begin{array}{l} \vec{x} = (x_1, \ldots, x_n) \\ \vec{v} = (v_1, \ldots, v_n) \end{array} \right\} \quad (9)$$

$$\sum_{i=1}^{n} x_i v_i \quad (10)$$

The notation "$X^T$" represents a transposed matrix of a matrix X.

Further, a base B and a base B* represented by Expression (11) satisfy the relationship of Expression (12).

$$\left. \begin{array}{l} \mathbb{B} := (b_1, \ldots, b_N) \\ \mathbb{B}^* := (b_1^*, \ldots, b_N^*) \end{array} \right\} \quad (11)$$

$$\left. \begin{array}{l} (x_1, \ldots, x_N)_\mathbb{B} := \sum_{k=1}^{N} x_i b_i, \\ (y_1, \ldots, y_N)_{\mathbb{B}^*} := \sum_{k=1}^{N} y_i b_i^* \end{array} \right\} \quad (12)$$

Description of Outline of First Embodiment

In the first embodiment, a partial match secret search scheme is implemented by applying-product predicate encryption.

A method of obtaining the inner product in the inner-product predicate encryption is now described with reference to FIG. 1 and FIG. 2.

As illustrated in FIG. 1, it is assumed that a ciphertext is a vector $\vec{x} = (x_1, x_2, \ldots, x_n)$ and a key is a vector $\vec{v} = (v_1, v_2, \ldots, v_n)$. The ciphertext vector $\vec{x}$ and the key vector $\vec{v}$ have the same number of elements. In this case, in the inner-product predicate encryption, an inner product $\sum_{i=1}^{n}(x_i \cdot v_i)$ of the vector $\vec{x}$ and the vector $\vec{v}$ is calculated, and the ciphertext is decrypted by the key. That is, the sum of the inner products of corresponding elements of the ciphertext vector $\vec{x}$ and the key vector $\vec{v}$ is calculated, and the ciphertext is decrypted by the key.

Further, as illustrated in FIG. 2, like in the case in which the ciphertext is the vector $\vec{x} = (x_i, x_2)$ and the key is the vector $\vec{v} = (v_1, v_2, \ldots, v_n)$, the number of elements of the ciphertext vector $\vec{x}$ and the key vector $\vec{v}$ may be different from each other. In this case as well, the sum of the inner products of corresponding elements of the ciphertext vector $\vec{x}$ and the key vector $\vec{v}$ is calculated, and the ciphertext is decrypted by the key. In the case of FIG. 2, the elements $x_i$ and $x_2$ of the vector $\vec{x}$ correspond to the elements $v_1$ and $v_2$ of the vector $\vec{v}$, respectively, and therefore the sum of the inner products of each of those elements is calculated. Meanwhile, regarding the elements $v_3, \ldots v_n$ of the vector $\vec{v}$, there are no corresponding elements of the vector $\vec{x}$, and therefore an inner product is not calculated.

Next, a basic configuration of the inner-product predicate encryption is described with reference to FIG. 3.

In general, in the inner-product predicate encryption, a secret value $s_0$ and a variance $s_t$ for each integer t of t∈ Iv are used. The secret value $s_0$ and the variance $s_t$ have a relationship of "$s_0 = \Sigma_{t \in I_v} s_t$." In the relationship, "t" is an index and "Iv" is a set of indices t.

The key includes an element $k^*_0$, which is a vector in a base $B^*_0$ in which the secret value $s_0$ is set, and for each integer t of t∈ Iv, an element $k^*_t$, which is a vector in the base $B^*_0$ in which the variance $s_t$, an attribute value $v_t$, and the index t are set. Meanwhile, the ciphertext includes an element $c_0$, which is a vector in the base $B_0$ corresponding to the base $B^*_0$, and for each integer t of t∈ Ix, an element $c_t$, which is a vector in the base $B^*_0$ corresponding to the base B* in which an attribute value $x_t$, and the index t are set. Here, "Ix" is a set of the indices t.

Then, the inner product of the element $k^*_0$ and the element $c_0$ is calculated, and for each integer t of t∈ Iv, the inner product of the element $k^*_t$ included in the key and the element $c_t$ included in the ciphertext is calculated. For each integer t of t∈ Iv, the variance $s_t$ is obtained when the attribute value $v_t$ set in the element $k^*_t$ and the attribute value $x_t$ set in the element $c_t$ correspond to each other. In this case, $s_0 = \Sigma_{t \in I_v} s_t$, and therefore when the variance $s_t$ set in all of the elements $k^*_t$ of t∈ Iv is obtained, the secret value $s_0$ set in the element $k^*_0$ is obtained. Then, in this case, the ciphertext can be decrypted by the key.

As described above, an index t is set for the element $k^*_t$, and the element $c_t$. Therefore, even when an attribute value $v_i$ and an attribute value $x_j$ correspond to each other for the integers i and j when i≠j, a variance $s_i$ is not obtained even when the inner product of the element $k^*_i$ and the element $c_t$ is calculated. Here, the index t indicates the position of each character in a character-string-to-be-searched and a search character string.

Next, a key technique of the partial match secret search scheme in the first embodiment is described with reference to FIG. 4.

In the basic configuration of the inner-product predicate encryption described above, an unintended search by a malicious third party is prevented by each element $\mu(t, -1)$ and $\sigma(1, t)$ relating to the index t of the element $c_t$ of the ciphertext and the element $k^*_t$ of the key. Meanwhile, it is not possible to calculate the variance $s_i$ unless the elements share the same index t, and therefore it is difficult to implement the partial match secret search without an additional mechanism and additional calculation.

Therefore, in the first embodiment, the method of setting the index t is changed. As illustrated in FIG. 4, first, a variance $\tau_t$ is newly used. That is, in the first embodiment, in the inner-product predicate encryption, the secret value $s_0$, a first variance $s_t$ for each integer t of t∈ Iv, and a second variance $\tau_t$ for each integer t of t∈ Iv are used. The secret value $s_0$ and the variance $s_t$ have a relationship of "$s_0 = \Sigma_{t \in I_v} s_t$." Further, the variance $\tau_t$ for each integer t satisfies the relationship of "$0 = \Sigma_{t \in I_v} s_t$."

Next, in the first embodiment, $\gamma \beta^{-t}$ is set for the element $c_t$ of the ciphertext in place of $\sigma(1, t)$. Further, $\gamma \beta^t \tau_t$ is set for the element $k^*_t$ of the key in place of $\mu(t, -1)$. That is, in the first embodiment, the key includes the element $k^*_0$ and the element $k^*_t$. The element $k^*_0$ is a vector in the base $B^*_0$ in which the secret value $s_0$ is set. The element $k^*_t$ is a vector in the base $B^*$ in which the first variance $s_t$, the second variance $\tau_t$, the attribute value $v_t$, and the index t are set for each integer t of t∈Iv. Meanwhile, the ciphertext includes the element $c_0$ and the element $c_t$. The element $c_0$ is a vector in the base $B_0$ corresponding to the base $B^*_0$. The element $c_t$ is a vector in the base B corresponding to the base $B^*$ in which the attribute value $x_t$ and the index −t are set for each integer t of t∈Ix.

In this case, it is assumed that β is a fixed element of $F_q$ having a sufficiently large order, and that γ and γ' are random numbers. However, the sign of the exponent of β may be switched between the ciphertext and the key. That is, in the above description, the index t is set for the key, which is the search character string, and the index −t is set for the ciphertext, which is the character-string-to-be-searched. However, the present invention is not limited to that case, and the index −t may be set for the key, which is the search character string, and the index t may be set for the ciphertext, which is the character-string-to-be-searched. Further, γ and γ' may be omitted. Moreover, β maybe disclosed, but β may also be shared in advance as secret information by using a secure communication path between a registrant and a searcher.

Therefore, for example, when a partial match secret search is performed between a ciphertext and a key sharing the same index t, the inner product is calculated based on the element $c_t$ of each ciphertext and the element $k^*_t$ of each key for each index t. As a result, the exponent of the elements of p for each index t cancel each other out, and $\gamma\gamma'\tau_t$ can be extracted. At this time, $0 = \gamma\gamma'\Sigma_{t \in Iv}\tau_t$, and hence the terms of $\tau_t$ cancel each other out, and the remaining variance $s_i$ can be obtained.

Next, there is described a case in which the partial match secret search is performed by shifting the index of the elements of the ciphertext by α with respect to the index t of the elements of the key. That is, in this case, the inner product of the element $c_{t+\alpha}$ of the ciphertext and the element $k^*_t$ of the key is calculated, and $\gamma\gamma'\beta^{-\alpha}\tau_t$ can be extracted for each index t. As a result, $0 = \gamma\gamma'\beta^{-\alpha}\Sigma_{t \in Iv}\tau_t$, and hence the terms of $\tau_t$ cancel each other out, and the remaining variance $s_i$ can be obtained.

In other words, the determination of a match can be performed only when all the elements of the key are shifted by a certain width α. This means that it is possible to implement the partial match secret search without performing search key conversion processing, and that an unintended search by replacing or separating characters can be prevented.

As described above, in the first embodiment, the first variance $s_t$ and the second variance $\tau_t$ are used in the inner-product predicate encryption. Further, the index t is set in one of the key, which is the search character string, and the ciphertext, which is the character-string-to-be-searched, and the index −t having an inverted sign is set in the other of the key and the ciphertext. Therefore, when the inner product is calculated, the index t can be canceled out. As a result, the search key conversion processing required in Patent Literature 2 is not required, and the search time can be shortened. Further, it is possible to prevent an unintended search by a malicious third party.

An implementation example of the partial match secret search scheme in the first embodiment is now described with reference to FIG. 5.

As illustrated in FIG. 5, encrypted tags $ET_x$ generated by encrypting the character-string-to-be-searched, which is a search tag "ABCDE," are stored in a database. At this time, it is assumed that the character string "CD" is given as the search character string.

In this case, ciphertext elements $c_t$ having each character of the character-string-to-be-searched "ABCDE" as an attribute value $x_t$ are generated. That is, an attribute value A is set in an element $c_1$, an attribute value B is set in an element $c_2$, an attribute value C is set in an element $c_3$, an attribute value D is set in an element $c_4$, and an attribute value E is set in an element $c_5$. In this way, in the encrypted tags $ET_x$, the position of each character of the character-string-to-be-searched is specified and set.

Meanwhile, the search key $TD_v$ in which each character of the character string "CD" is an attribute value $v_t$ is generated. That is, the attribute value C is set in the element $k^*_1$, and the attribute value D is set in the element $k^*_2$. In this way, in the search key $TD_v$, the position of each character of the search character string is specified and set.

In the search processing, as illustrated in FIG. 5, the determination regarding whether or not there is a match is performed by decrypting the encrypted tags $ET_x$ in order by shifting the element $k^*_t$ of the search key $TD_v$ in order one by one. In this implementation example, there is determined to be a match when the elements $c_3$ and $c_4$ are decrypted by the elements $k^*_1$ and $k^*_2$.

Figure 6:
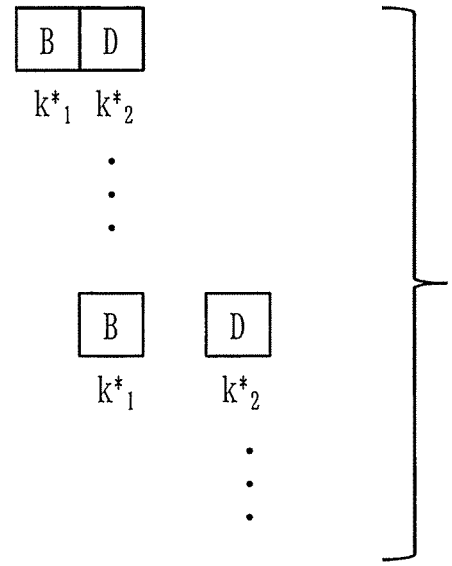
FIG. 6 is an explanatory diagram of an implementation example of the partial match secret search scheme in the first embodiment of the present invention.

Next, another implementation example of the partial match secret search scheme in the first embodiment is now described with reference to FIG. 6.

It is assumed that encrypted tags $ET_x$ generated by encrypting the character-string-to-be-searched, which is a search tag "ABCDE," are stored in a database, and that the character string "BD" is given as the search character string.

In this case, ciphertext elements $c_t$ having each character of the character-string-to-be-searched "ABCDE" as an attribute value $x_t$ are generated. That is, an attribute value A is set in an element $c_1$, an attribute value B is set in an element $c_2$, an attribute value C is set in an element $c_3$, an attribute value D is set in an element $c_4$, and an attribute value E is set in an element $c_5$.

Meanwhile, the search key $TD_v$ in which each character of the character string "BD" is an attribute value $v_t$ is generated. That is, the attribute value B is set in the element $k^*_1$, and the attribute value D is set in the element $k^*_2$.

In this implementation example, for example, as an unintended search, there is considered a case in which the elements $c_2$ and $c_4$ are decrypted by illegitimately separating the elements $k^*_1$ and $k^*_2$. At this time, the attribute value of each element matches, and hence calculating the inner product cancels out the $v_t$ and $x_t$ components to give a value of 0. Meanwhile, the term of $\tau_t$ extracted as a result of calculating the inner product is $\gamma\gamma'(\beta^{-1}\tau_1 + \beta^{-2}\tau_2) \neq 0$, meaning that the components are not canceled out, and therefore the result of partial match secret search is a "non-match."

Figure 7:
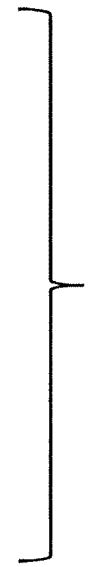
FIG. 7 is an explanatory diagram of an implementation example of the partial match secret search scheme in the first embodiment of the present invention.

Next, yet another implementation example of the partial match secret search scheme in the first embodiment is now described with reference to FIG. 7.

It is assumed that encrypted tags generated by encrypting the character-string-to-be-searched, which is a search tag "ABCDE," are stored in a database, and that the character string "BA" is given as the search character string.

In this case, ciphertext elements $c_t$ having each character of the character-string-to-be-searched "ABCDE" as an attribute value $x_t$ are generated. That is, an attribute value A is set in an element $c_1$, an attribute value B is set in an element $c_2$, an attribute value C is set in an element $c_3$, an attribute value D is set in an element $c_4$, and an attribute value E is set in an element $c_5$.

Meanwhile, the search key in which each character of the character string "BA" is an attribute value $v_t$ is generated. That is, the attribute value B is set in the element $k^*_1$, and the attribute value A is set in the element $k^*_2$.

In this implementation example, for example, as an unintended search, there is considered a case in which the elements $c_1$ and $c_2$ are decrypted by illegitimately replacing the elements $k^*_1$ and $k^*_2$. At this time, the attribute value of each element matches, and hence calculating the inner product cancels out the $v_t$ and $x_t$ components to give a value of 0. Meanwhile, the term of it extracted as a result of calculating the inner product is $\gamma\gamma'(\beta^{-1}\tau_1+\beta^1\tau_2)\neq 0$, meaning that the components are not canceled out, and therefore the result of partial match secret search is a "non-match."

In this way, in the first embodiment, as illustrated in FIG. 5, a determination of a match is possible only when all of the elements of the key are shifted by a certain width a. Meanwhile, in the case of an unintended search, for example, the separation of the characters as illustrated in FIG. 6 and the replacement of characters as illustrated in FIG. 7, the determination of a match becomes impossible. As a result, an unintended search by a malicious third party can be prevented.

<Description of Configuration of Secret Search System According to First Embodiment>

Before a configuration of a secret search system 10 according to the first embodiment is described, a basic configuration of the partial match secret search scheme in the first embodiment is described.

The partial match secret search scheme used by the secret search system 10 according to the first embodiment includes a KG algorithm, a TagGen algorithm, a TrapGen algorithm, and a Search algorithm.

In the KG algorithm, a security parameter k is input and a public key pk and a secret key sk are output.

The TagGen algorithm is a probabilistic algorithm in which the public key pk and an attribute vector $\vec{x}$ are input and an encrypted tag $ET_x$ is output.

The TrapGen algorithm is a probabilistic algorithm in which the public key pk, the secret key sk, and a predicate vector $\vec{v}$ are input, and a search key $TD_v$ is output.

The Search algorithm is a deterministic algorithm in which the public key pk, the encrypted tag $ET_x$, and the search key $TD_v$ are input, and a "0" indicating that there has been a hit in the search or a "1" indicating that there has not been a hit in the search is output.

The secret search system 10 according to the first embodiment is now described with reference to FIG. 8.

Figure 8:
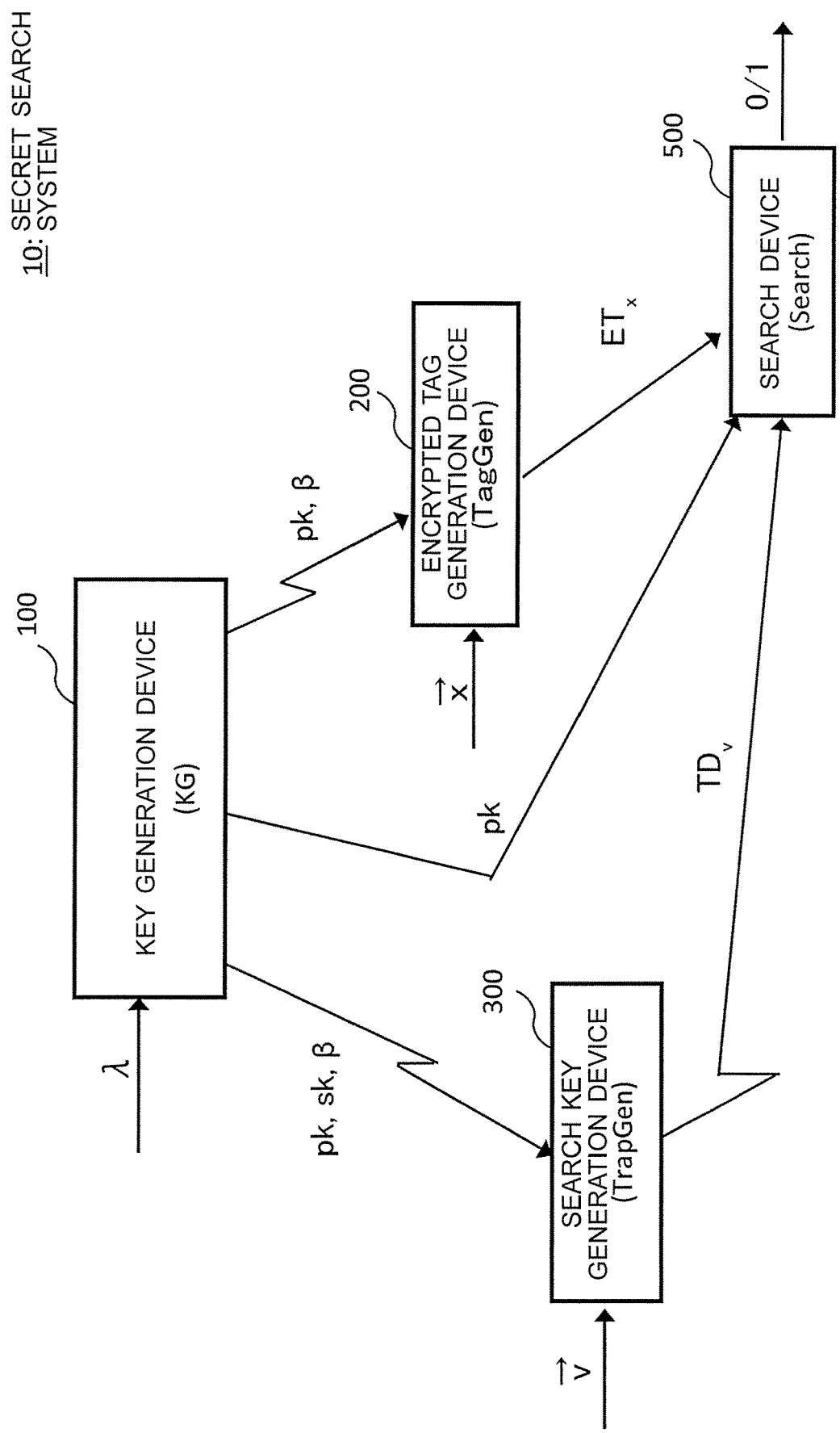
FIG. 8 is a configuration diagram of a secret search system according to the first embodiment of the present invention.

The secret search system 10 illustrated in FIG. 8 generates the search key $TD_v$ in which the position of each character of the search character string is specified and set. Further, the secret search system 10 generates a plurality of the encrypted tags $ET_x$ in which the position of each character of a character-string-to-be-searched is specified and set. The secret search system 10 searches for the encrypted tag $ET_x$ corresponding to the generated search key $TD_v$. At this time, as described above, the secret search system 10 sets for the search key $TD_v$ an index t indicating the position of each character, and sets for the encrypted tags $ET_x$ an index –t having a sign obtained by inverting a sign of the index t. Therefore, during a search, by adding the index t and the index –t set for the search key $TD_v$ and the encrypted tag $ET_x$, the positions set in both of those indices are canceled out, and an encrypted tag $ET_x$ including the search key $TD_v$ as the partial character string is searched for.

As illustrated in FIG. 8, the secret search system 10 includes a key generation device 100, an encrypted tag generation device 200, a search key generation device 300, and a search device 500.

In this case, the key generation device 100, the encrypted tag generation device 200, the search key generation device 300, and the search device 500 are separate devices, but two or more of those devices may be configured as one device. Therefore, the terms "key generation device 100," "encrypted tag generation device 200," "search key generation device 300," and "search device 500" may also be read as "key generation unit," "encrypted tag generation unit," "search key generation unit," and "search unit," respectively, and may each serve as a constituent element of one or more devices.

The key generation device 100 is configured to execute the KG algorithm by using the security parameter λ as an input to output the public key pk, the secret key sk, and a fixed value β. The security parameter λ is input by, for example, an administrator of the secret search system 10 on an input device connected to an input interface of the secret search system 10.

The encrypted tag generation device 200 is configured to execute the TagGen algorithm by using the public key pk, the attribute vector $\vec{x}$, and the fixed value β as inputs to generate an encrypted tag $ET_x$. The attribute vector $\vec{x}$ is input by, for example, the administrator of the secret search system 10 or a user of the encrypted tag generation device 200 on the input device connected to the input interface of the secret search system 10.

The search key generation device 300 is configured to execute the TrapGen algorithm by using the public key pk, the secret key sk, the predicate vector $\vec{v}$, and the fixed value β as inputs to generate the search key $TD_v$. The predicate vector $\vec{v}$ is input by, for example, the administrator of the secret search system 10 or the user of the search key generation device 300 on the input device connected to the input interface of the secret search system 10.

The search device 500 is configured to execute the Search algorithm by using the public key pk, an encrypted tag $ET_x$, and the search key $TD_v$ as inputs to search for an encrypted tag $ET_x$ including the search key $TD_v$ as the partial character string. The search device 500 outputs a "0" indicating that there has been a hit in the search or a "1" indicating that there has not been a hit in the search is output.

Next, a configuration of the key generation device 100 in the first embodiment is described with reference to FIG. 9.

Figure 9:
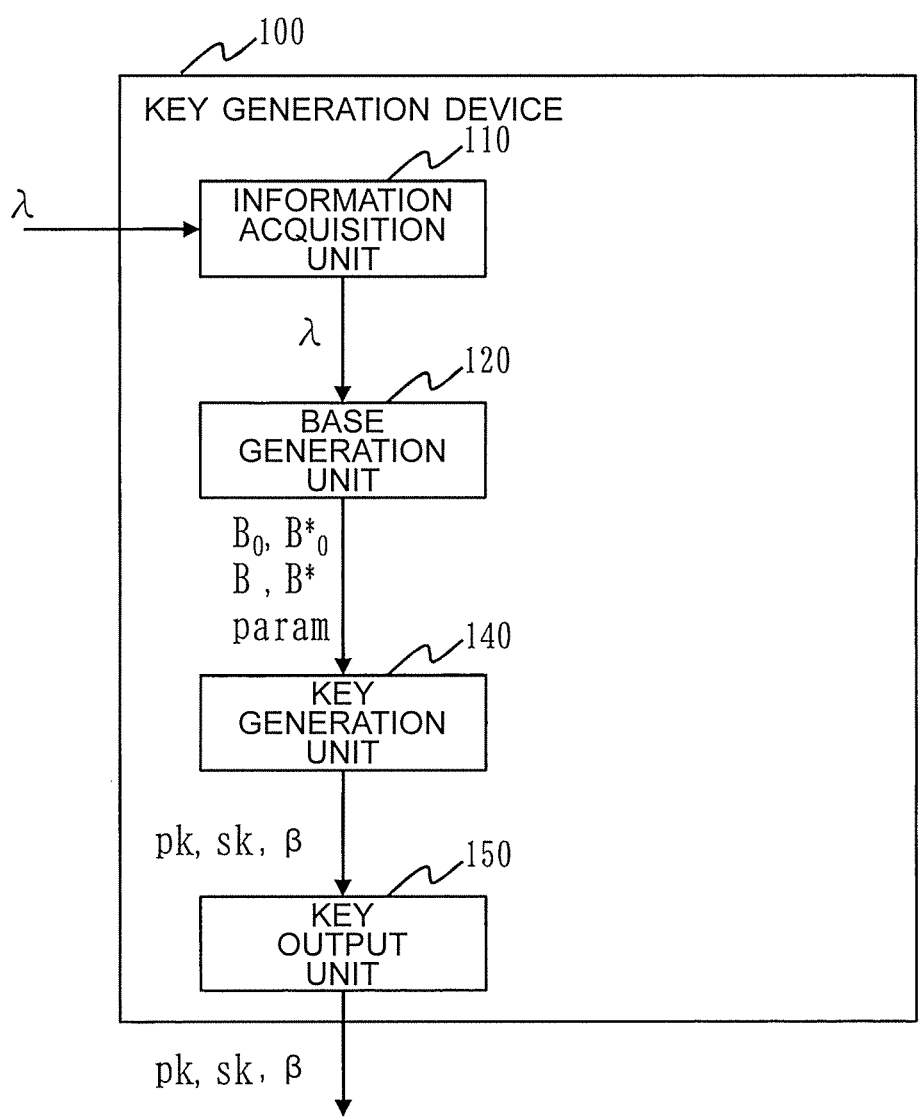
FIG. 9 is a configuration diagram of a key generation device in the first embodiment of the present invention.

As illustrated in FIG. 9, the key generation device 100 includes an information acquisition unit 110, a base generation unit 120, a key generation unit 140, and a key output unit 150.

The information acquisition unit 110 is configured to acquire the security parameter λ input from the input device connected to the secret search system 10.

The base generation unit 120 is configured to generate, based on the security parameter λ, the base $B_0$, the base $B^*_0$, the base B, and the base $B^*$, which are bases for implementing the partial match secret search scheme. Further, the base generation unit 120 generates a parameter "param." The method of generating those bases and the parameter is described later.

The key generation unit 140 is configured to use the base $B_0$, the base B, and the parameter "param" to generate the public key pk. Further, the key generation unit 140 uses the base $B^*_0$ and the base $B^*$ to generate the secret key sk.

Moreover, the key generation unit 140 generates the fixed value β. The method of generating the public key pk, the secret key sk, and the fixed value β is described later.

The key output unit 150 is configured to disclose the public key pk generated by the key generation unit 140. Further, the key output unit 150 outputs the secret key sk generated by the key generation unit 140 to the search key generation device 300. Moreover, the key output unit 150 outputs the fixed value β generated by the key generation unit 140 to the encrypted tag generation device 200 and the search key generation device 300. At this time, the fixed value β may be disclosed, or may be output as secret information to the encrypted tag generation device 200 and the search key generation device 300 by using a secure communication path.

Next, a configuration of the encrypted tag generation device 200 in the first embodiment is described with reference to FIG. 10.

Figure 10:
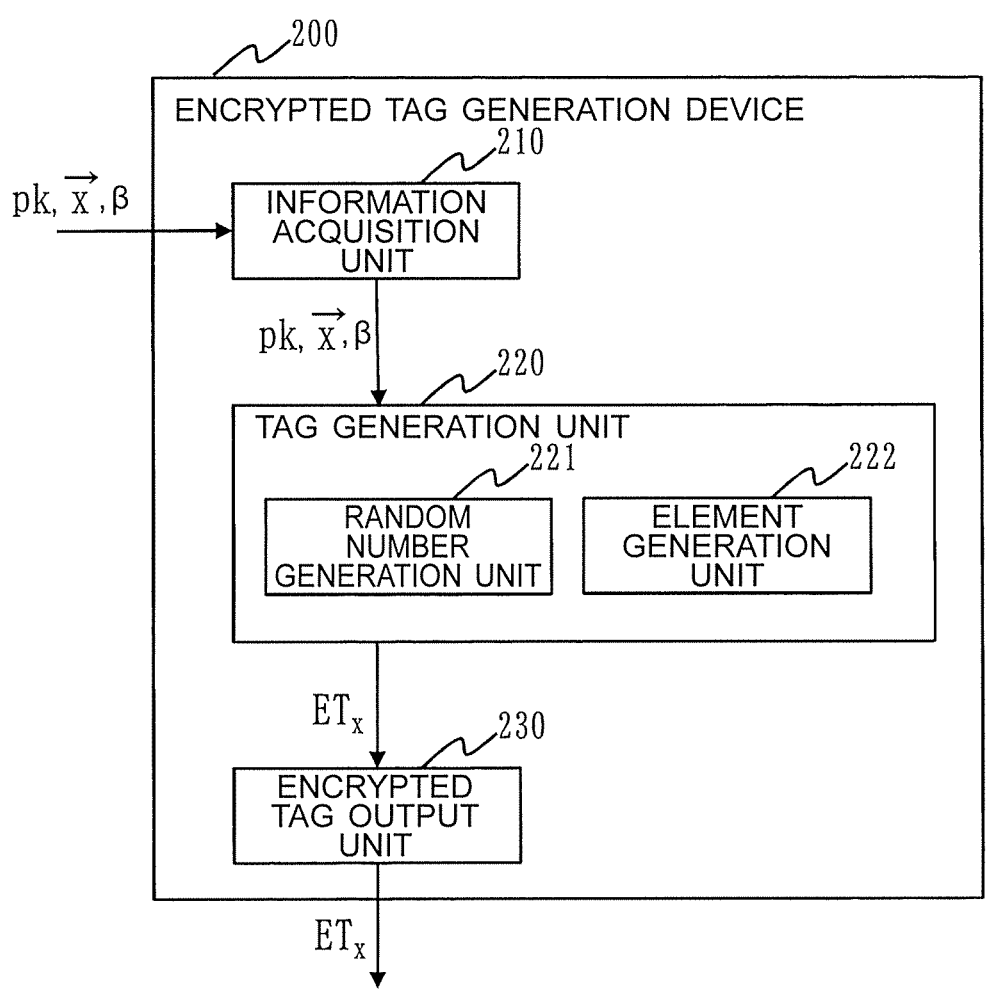
FIG. 10 is a configuration diagram of an encrypted tag generation device in the first embodiment of the present invention.

As illustrated in FIG. 10, the encrypted tag generation device 200 includes an information acquisition unit 210, a tag generation unit 220, and an encrypted tag output unit 230.

The information acquisition unit 210 is configured to acquire the public key pk and the fixed value β from the key generation device 100, and also to acquire the attribute vector $\vec{x}$ input from the input device connected to the secret search system 10.

The tag generation unit 220 is configured to use the public key pk, the fixed value β, and the attribute vector $\vec{x}$ to generate an encrypted tag $ET_x$ including one or more tag vectors $c_t$ in the base B. The tag generation unit 220 includes a random number generation unit 221 and an element generation unit 222. Operation of each of the random number generation unit 221 and the element generation unit 222 is described later.

The encrypted tag output unit 230 is configured to output the encrypted tag $ET_x$ to the search device 500.

Next, a configuration of the search key generation device 300 in the first embodiment is described with reference to FIG. 11.

Figure 11:
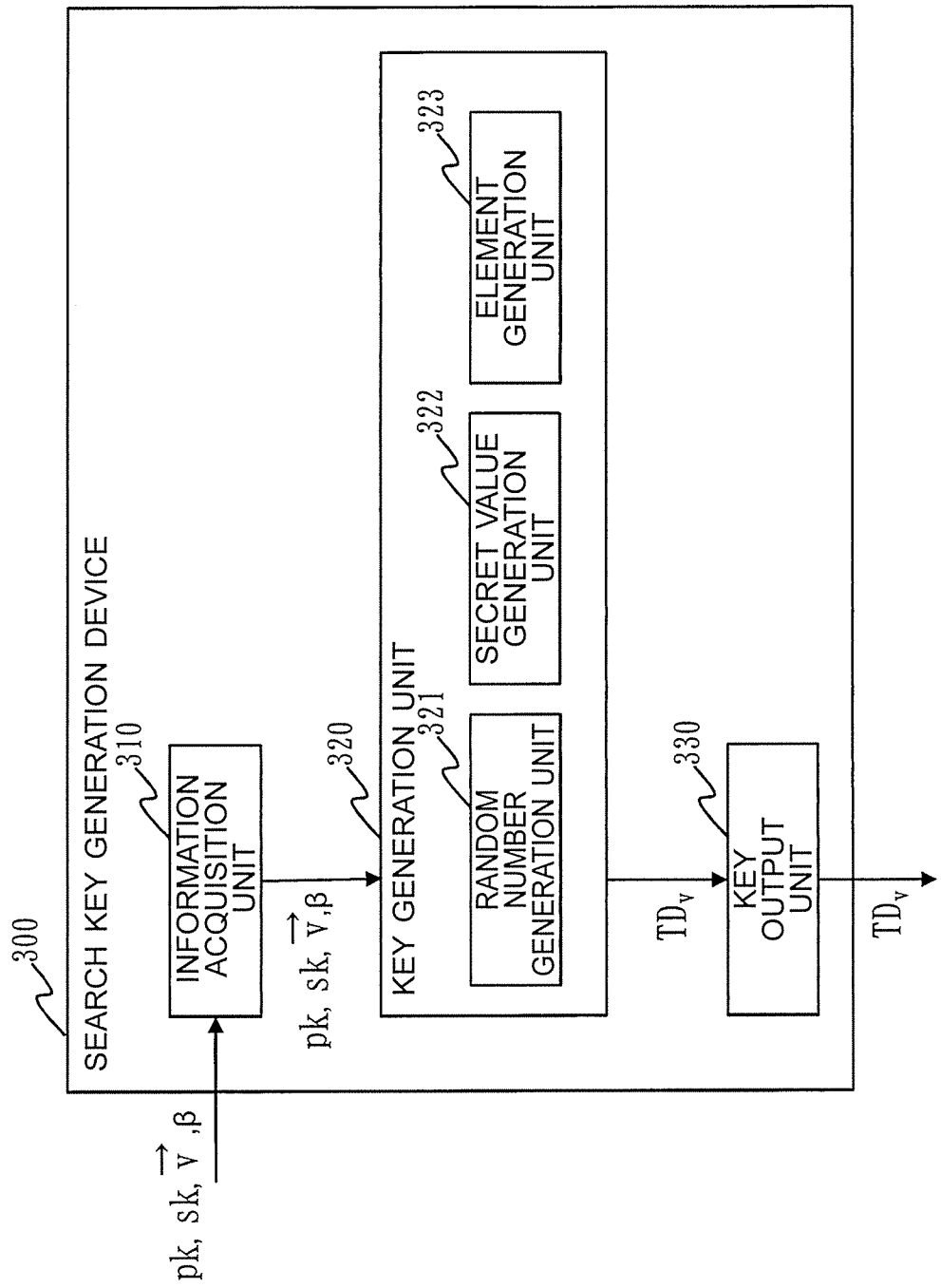
FIG. 11 is a configuration diagram of a search key generation device in the first embodiment of the present invention.

As illustrated in FIG. 11, the search key generation device 300 includes an information acquisition unit 310, a key generation unit 320, and a key output unit 330.

The information acquisition unit 310 is configured to acquire the public key pk, the secret key sk, and the fixed value β from the key generation device 100, and also to acquire the predicate vector $\vec{v}$ from the input device connected to the secret search system 10.

The key generation unit 320 is configured to use the public key pk, the secret key sk, the fixed value β, and the predicate vector $\vec{v}$ to generate a search key $TD_v$ in which the position of each character of the character string is specified and set. Here, the key generation unit 320 generates a search key $TD_v$ including the one or more search vectors $k^*_t$ in the base B*. The key generation unit 320 includes a random number generation unit 321, a secret value generation unit 322, and an element generation unit 323. Operation of each of the random number generation unit 321, the secret value generation unit 322, and the element generation unit 323 is described later.

The key output unit 330 is configured to output the search key $TD_v$ generated by the key generation unit 320 to the search device 500.

Next, a configuration of the search device 500 in the first embodiment is described with reference to FIG. 12.

Figure 12:
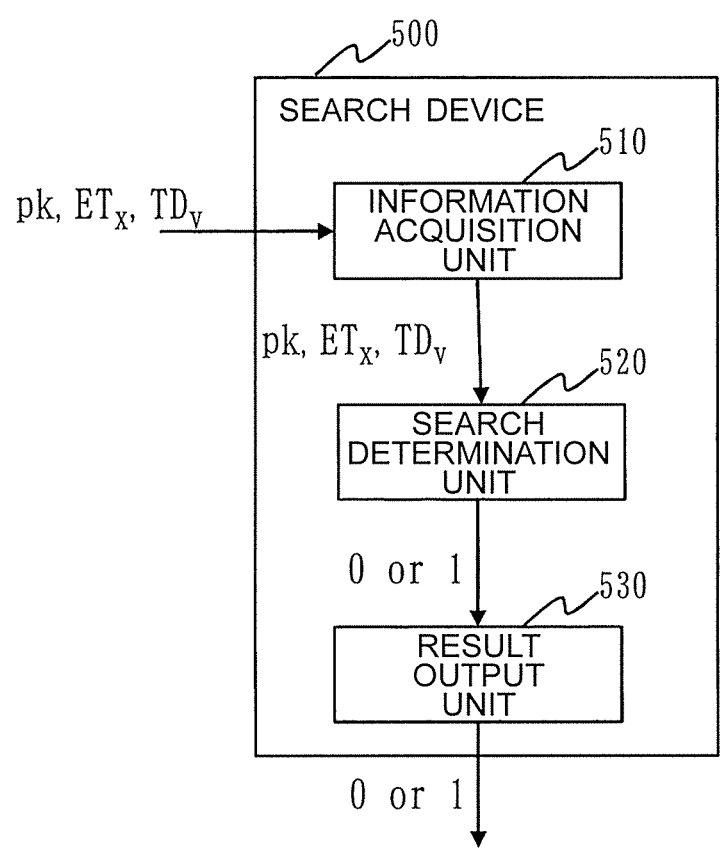
FIG. 12 is a configuration diagram of a search device in the first embodiment of the present invention.

As illustrated in FIG. 12, the search device 500 includes an information acquisition unit 510, a search determination unit 520, and a result output unit 530.

The information acquisition unit 510 is configured to acquire the public key pk from the key generation device 100. Further, the information acquisition unit 510 acquires the encrypted tag $ET_x$ from the encrypted tag generation device 200. Moreover, the information acquisition unit 510 acquires the search key $TD_v$ from the search key generation device 300.

The search determination unit 520 is configured to search for, from among a plurality of encrypted tags $ET_x$ which are generated by the encrypted tag generation device 200 and in which the position of each character of a character string is specified and set, for each character set in the search key $TD_v$ generated by the search key generation device 300, an encrypted tag $ET_x$ having a match between the character and the character set at the position specified for the character. In this case, the search determination unit 520 determines whether or not there is a hit in the search by using the public key pk and the search key $TD_v$ to decrypt the encrypted tags $ET_x$. That is, the search determination unit 520 searches for an encrypted tag $ET_x$ corresponding to the search key $TD_v$ generated by the search key generation device 300 from among the plurality of encrypted tags $ET_x$ generated by the encrypted tag generation device 200.

The result output unit 530 is configured to output a "0" indicating that there has been a hit in the search or a "1" indicating that there has not been a hit in the search.

<Description of Operation of Secret Search System According to First Embodiment>

Operation of the secret search system 10 according to the first embodiment is now described with reference to FIG. 13 to FIG. 16.

[Description of Processing of KG Algorithm]

Figure 13:
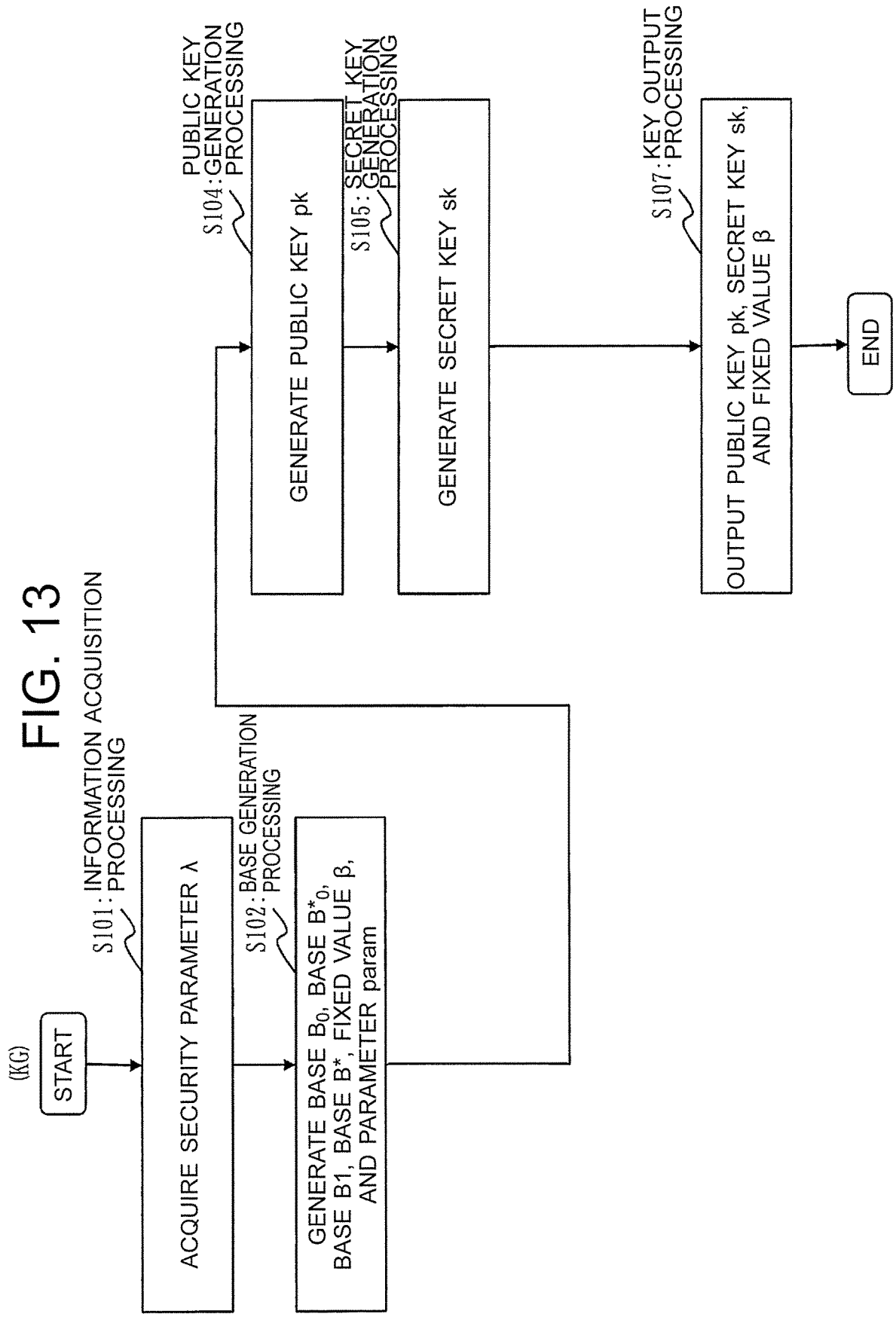
FIG. 13 is a flowchart of processing of a KG algorithm in the first embodiment of the present invention.

First, the processing of the KG algorithm is described with reference to FIG. 13. As described above, the KG algorithm is executed by the key generation device 100. The KG algorithm corresponds to a key generation step in a secret search method according to the first embodiment. Further, the KG algorithm corresponds to key generation processing in a secret search program in the first embodiment.

[Step S101: Information Acquisition Processing]

In Step S101, the information acquisition unit 110 acquires the security parameter λ. The security parameter λ is input by, for example, the administrator of the secret search system 10 on the input device.

[Step S102: Base Generation Processing]

In Step S102, the base generation unit 120 calculates the following Expression (13) by using the security parameter λ as an input to generate the base $B_0$, the base $B^*_0$, a base $B_1$, a base $B^*_i$, and the parameter "param" of a dual pairing vector space. In the following description, "base $B_1$" and "base $B^*_1$" are also written as "base B" and "base B*," respectively. Further, the fixed value "β" is generated as the element of $F_q$ having a sufficiently large order.

$$(\text{param}, (\mathbb{B}_0, \mathbb{B}_0^*), (\mathbb{B}_1, \mathbb{B}_1^*)) \xleftarrow{R} \mathcal{G}_{ob}(1^\lambda, N_0 = 5, N_1 = 3 + n_1 + n_2 + n_3)), \quad (13)$$

$$\mathcal{G}_{ob}(1^\lambda, N_0, N_1)):$$

$$\text{param}_{\mathbb{G}} := (q, \mathbb{G}, \mathbb{G}_T, g, e) \xleftarrow{R} \mathcal{G}_{bpg}(1^\lambda),$$

$$\psi \xleftarrow{U} \mathbb{F}_q^x, \, g_T := e(g, g)^\psi,$$

for $t = 0, 1$ $$\text{param}_{\mathbb{V}_t} := (q, \mathbb{V}_t, \mathbb{G}_T, \mathbb{A}_t, e) \xleftarrow{R} \mathcal{G}_{dpvs}(1^\lambda, N_t, \text{param}_{\mathbb{G}}),$$

$$X_t = \begin{pmatrix} \vec{\chi}_{t,1} \\ \vdots \\ \vec{\chi}_{t,N_t} \end{pmatrix} := (\chi_{t,i,j})_{i,j} \xleftarrow{U} GL(N_t, \mathbb{F}_q),$$

$$\begin{pmatrix} \vec{v}_{t,1} \\ \vdots \\ \vec{v}_{t,N_t} \end{pmatrix} := (v_{t,i,j})_{i,j} := \psi \cdot (X_t^T)^{-1},$$

$$b_{t,i} := \sum_{j=1}^{N_t} \chi_{t,i,j} a_{t,j}, \, \mathbb{B}_t := (b_{t,1}, \ldots, b_{t,N_t}),$$

$$b_{t,i}^* := \sum_{j=1}^{N_t} v_{t,i,j} a_{t,j}, \, \mathbb{B}_t^* := (b_{t,1}^*, \ldots, b_{t,N_t}^*),$$

$$\text{param} := (\{\text{param}_{\mathbb{V}_t}\}_{t=0,1}, g_T),$$

return param, $\{\mathbb{B}_0, \mathbb{B}_0^*\}, \{\mathbb{B}_1, \mathbb{B}_1^*\}$.

In Expression (13), $G_{bpg}$ is a function for generating a bilinear pairing group, and $G_{dpvs}$ is a function for generating a dual pairing vector space.

[Step S104: Public Key Generation Processing]

In Step S104, the key generation unit 140 generates a partial base $\hat{B}_0$ of the base $B_0$ generated in Step S102 and a partial base $\hat{B}$ of the base $B$, as represented by the following Expression (14).

$$\hat{\mathbb{B}}_0 := (b_{0,1}, b_{0,3}, b_{0,5}) \quad (14)$$
$$\hat{\mathbb{B}} := (b_{1,1}, b_{1,2}, b_{1,3}, b_{1,3+n_1+n_2+1}, \ldots, b_{1,3+n_1+n_2+n_3})$$

The key generation unit 140 sets the partial bases $\hat{B}_0$ and $\hat{B}$ and the parameter "param" generated in Step S102 as the public key pk.

[Step S105: Secret Key Generation Processing]

In Step S105, the key generation unit 140 generates a partial base $\hat{B}_0^*$ of the base $B_0^*$ generated in Step S102 and a partial base $\hat{B}^*$ of the base $B^*$, as represented by the following Expression (15). The notation "$\hat{\ }$" means that $\hat{\ }$ is added above the symbol written before the notation.

$$\hat{\mathbb{B}}_0^* := (b_{0,1}^*, b_{0,3}^*, b_{0,5}^*), \quad (15)$$
$$\hat{\mathbb{B}}^* := (b_{1,1}^*, b_{1,2}^*, b_{1,3}^*, b_{1,3+n_1+1}^*, \ldots, b_{1,3+n_1+n_2}^*)$$

The key generation unit 140 sets the partial base $\hat{B}_0^*$ and the partial base $\hat{B}^*$ as the secret key sk.

[Step S107: Key Output Processing]

In Step S107, the key output unit 150 outputs the public key pk generated in Step S104 to a server for disclosure, for example, to disclose the public key pk. Further, the key output unit 150 outputs, in a manner maintaining secrecy, the secret key sk generated in Step S105 to the search key generation device 300. Moreover, the key output unit 150 outputs the fixed value β generated in Step S102 to the encrypted tag generation device 200 and the search key generation device 300. At this time, the fixed value β may be output to the encrypted tag generation device 200 and the search key generation device 300 by disclosing the fixed value β, or may be output as secret information to the encrypted tag generation device 200 and the search key generation device 300 by using a secure communication path.

[Description of Processing of TagGen Algorithm]

Figure 14:
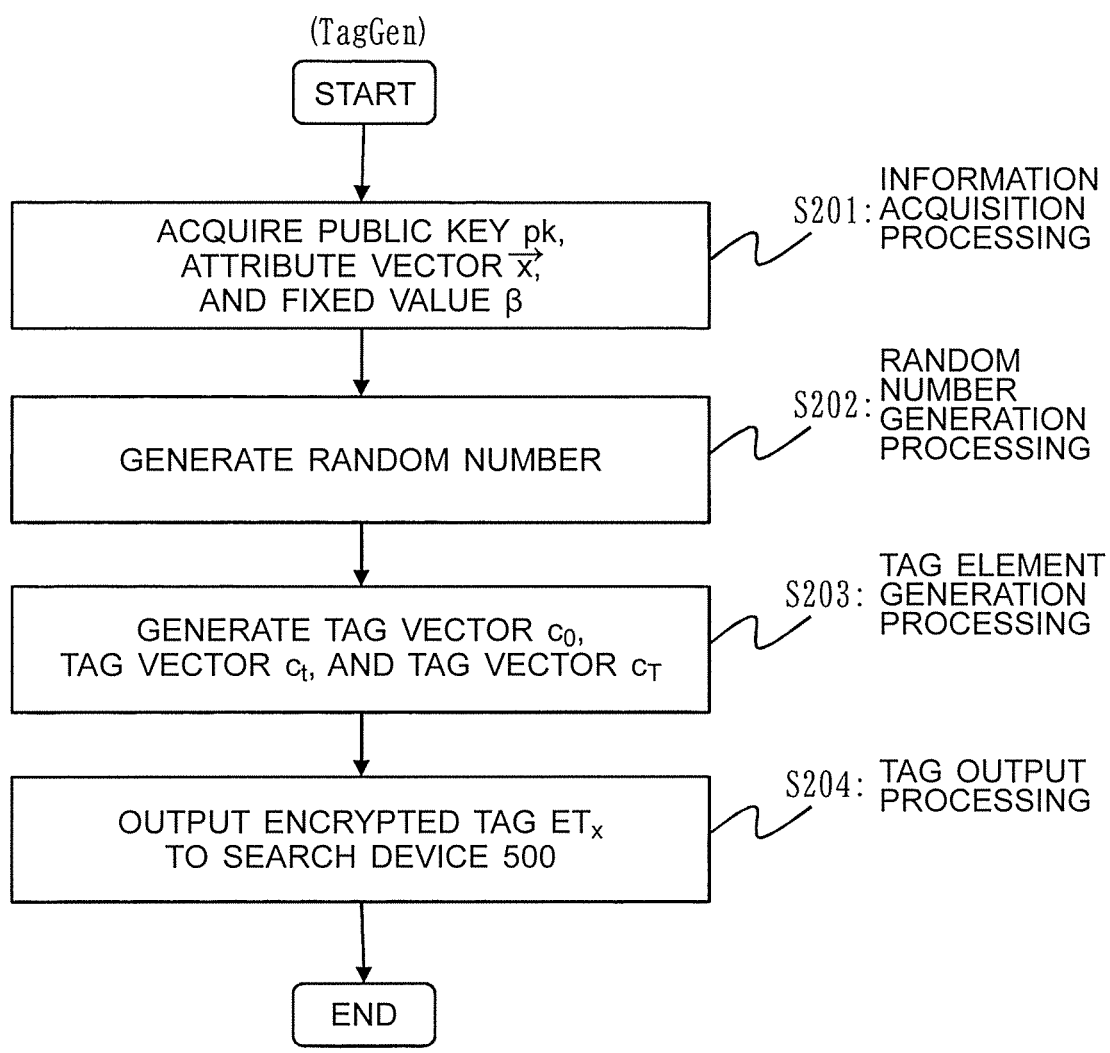
FIG. 14 is a flowchart of processing of a TagGen algorithm in the first embodiment of the present invention.

Next, processing of the TagGen algorithm in the first embodiment is described with reference to FIG. 14. As described above, the TagGen algorithm is executed by the encrypted tag generation device 200. The TagGen algorithm corresponds to an encrypted tag generation step in the secret search method according to the first embodiment. Further, the TagGen algorithm corresponds to encrypted tag generation processing in the secret search program in the first embodiment.

[Step S201: Information Acquisition Processing]

In Step S201, the information acquisition unit 210 acquires the public key pk disclosed by the key generation device 100. The information acquisition unit 210 also acquires the fixed value β output by the key generation device 100.

Further, the information acquisition unit 210 acquires the attribute vector $x^\rightarrow$ input on the input device by the user of the encrypted tag generation device 200, for example. The attribute vector $x^\rightarrow$ is represented by the following expression.

Attribute vector $x^\rightarrow := \{(t, x_t) | t \in Ix \subseteq \{1, \ldots\}\}$ In the expression, Ix is a set of indices. For example, as described with reference to FIG. 5 to FIG. 7, each character of the character string serving as the search tag is set in each element $x_t$ of the attribute vector $x^\rightarrow$.

[Step S202: Random Number Generation Processing]

In Step S202, the random number generation unit 221 generates a random number in the manner represented by Expression (16).

$$\gamma, \omega, \tilde{\omega}, \zeta, \sigma_t, \varphi_0, \varphi_{t,1}, \ldots, \varphi_{t,n_3} \xleftarrow{U} \mathbb{F}_q \text{ for } t \in Ix \quad (16)$$

[Step S203: Tag Element Generation Processing]

In Step S203, the element generation unit 222 generates, as represented by Expression (17), a tag vector $c_0$, a tag vector $c_t$ for each integer t of t∈Ix, and a tag vector $c_T$ by using the public key pk and the attribute vector $x^\rightarrow$ acquired in Step S201 and the random number generated in Step S202 as inputs. In the expression, β is a fixed element of $F_q$ having a sufficiently large order.

$$c_0 := (\tilde{\omega}, 0, \zeta, 0, \varphi_0)_{\mathbb{B}_0},$$
$$c_t := (\gamma\beta^{-t}, \frac{1}{\omega x_t}, \frac{1}{\tilde{\omega}}, \frac{n_1}{0^{n_1}}, \frac{n_2}{0^{n_2}}, \overline{\varphi_{t,1}, \ldots, \varphi_{t,n_3}})_{\mathbb{B}},$$
$$c_T := g_T^\zeta$$
(17)

[Step S204: Tag Output Processing]

In Step S204, the encrypted tag output unit 230 outputs the encrypted tag $ET_x$ to the search device 500. The encrypted tag $ET_x$ includes, as elements, a set Ix of the indices acquired in Step S201, and the tag vector $c_0$, the tag vector $c_t$ for each integer t of t∈Ix, and the tag vector $c_T$ generated in Step S203.

[Description of Processing of TrapGen Algorithm]

Figure 15:
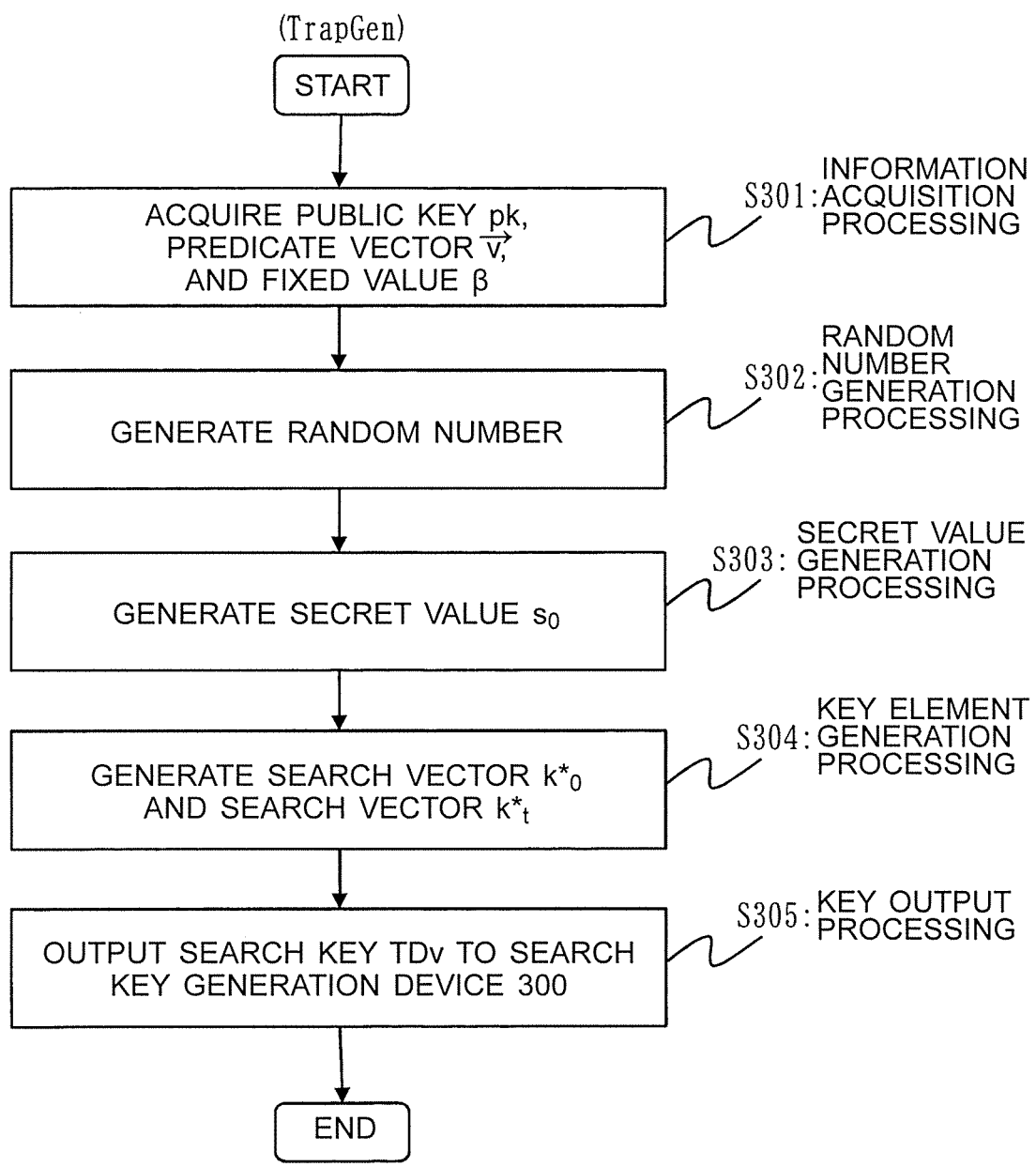
FIG. 15 is a flowchart of processing of a TrapGen algorithm in the first embodiment of the present invention.

Next, processing of the TrapGen algorithm in the first embodiment is described with reference to FIG. 15. As described above, the TrapGen algorithm is executed by the search key generation device 300. The TrapGen algorithm corresponds to a search key generation step in the secret search method according to the first embodiment. Further, the TrapGen algorithm corresponds to search key generation processing in the secret search program in the first embodiment.

[Step S301: Information Acquisition Processing]

In Step S301, the information acquisition unit 310 acquires the public key pk disclosed by the key generation device 100 and the secret key sk output by the key generation device 100. The information acquisition unit 310 also acquires the fixed value β output by the key generation device 100.

Further, the information acquisition unit 310 acquires the predicate vector $v^\rightarrow$ input on the input device by the user of the search key generation device 300, for example. The predicate vector $v^\rightarrow$ is represented by the following expression.

Predicate vector $v^\rightarrow := \{(t,v_t)|t \in Iv \subseteq \{1, \ldots\}\}$ In the expression, Iv is a set of indices. For example, as described with reference to FIG. 5 to FIG. 7, each character of the character string serving as the search character string is set in each element $v_t$ of the predicate vector $v^\rightarrow$.

[Step S302: Random Number Generation Processing]

In Step S302, the random number generation unit 321 generates a random number in the manner represented by Expression (18). However, unlike $s_t$, $\tau_t$ is generated so as to satisfy $0 = \Sigma_{t \in Iv} \tau_t$.

$$\gamma', s_t, \delta, \eta_0, \eta_{t,1}, \ldots, \eta_{t,n_2} \xleftarrow{U} \mathbb{F}_q \text{ for } t \in Iv$$
$$t_0 \in I'',$$
$$\tau_t \xleftarrow{U} \mathbb{F}_q \text{ for } t \in Iv \setminus \{t_0\}$$
$$\tau_{t_0} := -\sum_{t \in Iv \setminus \{t_0\}} \tau_t$$
(18)

[Step S303: Secret Value Generation Processing]

In Step S303, the secret value generation unit 322 generates a secret value $s_0 = \Sigma_{t \in Iv} s_t$ by using the random number $s_t$ for each integer t of t∈Iv generated in Step S202 as an input.

[Step S304: Key Element Generation Processing]

In Step S304, the element generation unit 323 generates, as represented by Expression (19), a search vector $k^*_0$ and a search vector $k^*_t$ for each integer t of t∈Iv by using the public key pk, the secret key sk, and the predicate vector $v^\rightarrow$ acquired in Step S301, the random number generated in Step S302, and the secret value $s_0$ generated in Step S303 as inputs. In the expression, β is a fixed element of $F_q$ having a sufficiently large order.

$$k^*_0 := (-s_0, 0, 1, \eta_0, 0)_{\mathbb{B}^*_0},$$
$$k^*_t := (\gamma'\beta^t \tau_t, \frac{1}{\delta v_t}, \frac{1}{s_t}, \frac{n_1}{0^{n_1}}, \overline{\eta_{t,1}, \ldots, \eta_{t,n_2}}, \frac{n_3}{0^{n_3}})_{\mathbb{B}^*}$$
(19)

[Step S305: Key Output Processing]

In Step S305, the key output unit 330 outputs the search key $TD_v$ to the search device 500. The search key $TD_v$ includes, as elements, a set Iv of the indices acquired in Step S301 and the search vector $k^*_0$ and the search vector $k^*_t$ for each integer t of t∈Iv generated in Step S304.

[Description of Processing of Search Algorithm]

Figure 16:
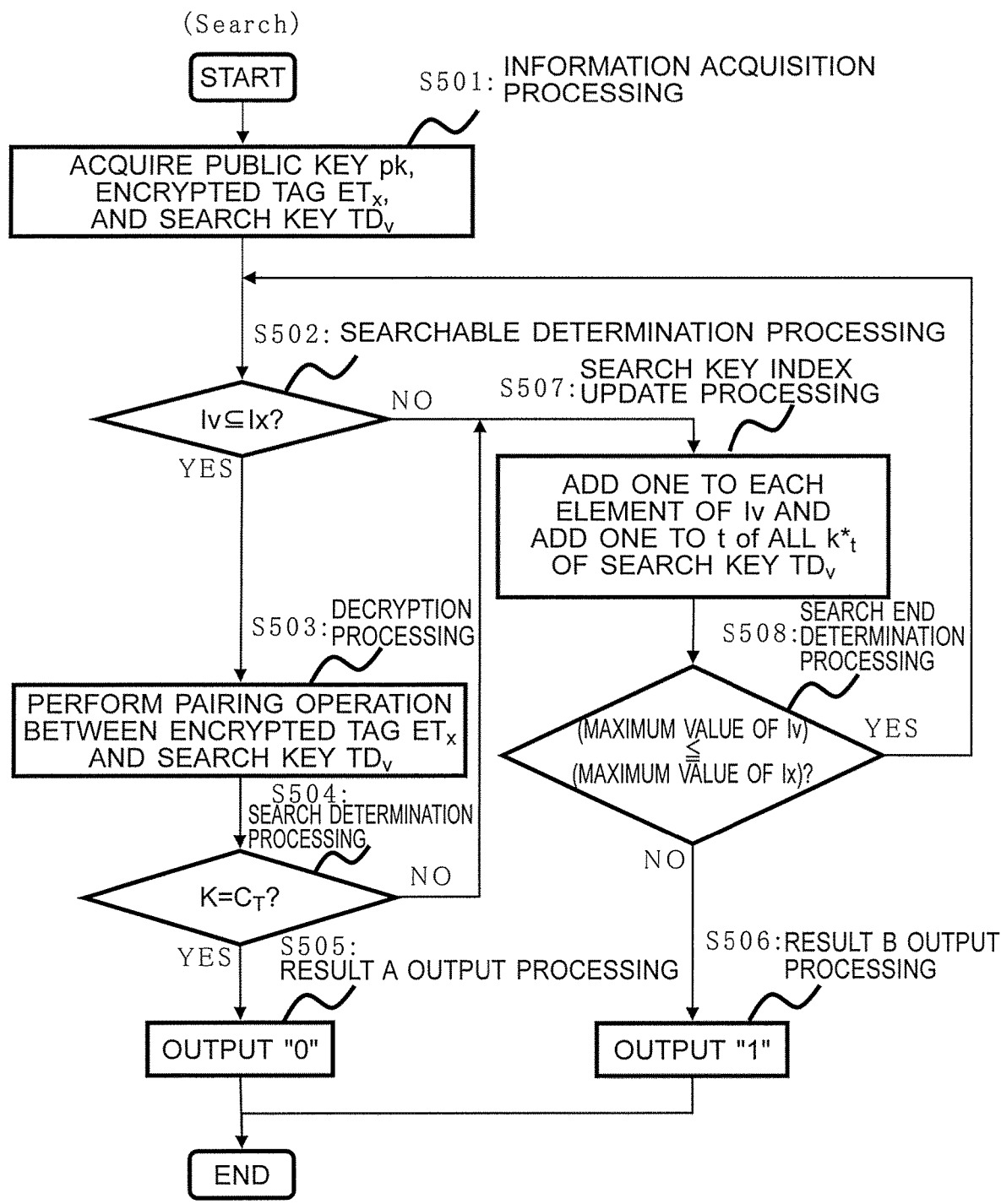
FIG. 16 is a flowchart of processing of a Search algorithm in the first embodiment of the present invention.

Next, processing of the Search algorithm in the first embodiment is described with reference to FIG. 16. As described above, the Search algorithm is executed by the search device 500. The Search algorithm corresponds to a search step in the secret search method according to the first embodiment. Further, the Search algorithm corresponds to search processing in the secret search program in the first embodiment.

[Step S501: Information Acquisition Processing]

In Step S501, the information acquisition unit 510 acquires the public key pk disclosed by the key generation device 100. The information acquisition unit 510 also acquires the encrypted tag $ET_x$ output by the encrypted tag generation device 200. Further, the information acquisition unit 510 acquires the search key $TD_v$ output by the search key generation device 300.

[Step S502: Searchable Determination Processing]

In Step S502, the search determination unit 520 determines whether or not the set Iv of the indices included in the search key $TD_v$ acquired in Step S501 is a subset of the set Ix of the indices included in the encrypted tag $ET_x$ acquired in Step S501.

When the set Iv of indices is a subset of the set Ix of indices, the search determination unit 520 determines that the set Iv of indices is searchable, and the processing advances to Step S503. Meanwhile, when the set Iv of indices is not a subset of the set Ix of indices, the search determination unit 520 determines that the set Iv of indices is not searchable, and the processing advances to Step S507.

[Step S503: Decryption Processing]

In Step S503, as represented by Expression (20), the search determination unit 520 performs a pairing operation between the tag included in the encrypted tag $ET_x$ and the search vector included in the search key $TD_v$, to thereby calculate a session key K.

$$K := e(c_0, k^*_0) \cdot \prod_{t \in Iv} e(c_t, k^*_t)$$
(20)

That is, the search determination unit 520 performs processing of decrypting the encrypted tag $ET_x$ by using the public key pk and the search key $TD_v$ based on a method referred to as "inner-product predicate encryption."

[Step S504: Search Determination Processing]

In Step S504, the search determination unit 520 determines whether or not the session key K calculated in Step S503 is the same as the tag vector $c_T$ included in the encrypted tag $ET_x$.

When the search determination unit 520 determines that the session key K is the same as the tag vector $c_T$, the processing advances to Step S505. Meanwhile, when the search determination unit 520 determines that the session key K is not the same as the tag vector $c_T$, the processing advances to Step S507.

[Step S505: "Result A" Output Processing]

In Step S505, the result output unit 530 outputs a "0" indicating that there has been a hit in the search.

[Step S507: Search Key Index Update Processing]

In Step S507, the search determination unit 520 adds one to each element of the set Iv of the indices included in the search key $TD_v$ acquired in Step S501. Further, the search determination unit 520 adds one to the index t of each search vector $k^*_t$ included in the search key $TD_v$.

[Step S508: Search End Determination Processing]

In Step S508, when the maximum index included in the set Iv of indices included in the search key $TD_v$ updated in Step S507 is equal to or less than the maximum index included in the set Ix of indices included in the encrypted tag $ET_x$ acquired in Step S501, the search determination unit 520 advances the processing to Step S502. When this is not the case, the search determination unit 520 advances the processing to Step S506. [Step S506: "Result B" Output Processing]

In Step S506, the result output unit 530 outputs a "1" indicating that there has not been a hit in the search.

That is, the search device 500 searches for an encrypted tag $ET_x$ corresponding to the search key $TD_v$ by performing a calculation using the search vector $k^*_t$ included in the search key $TD_v$ and the tag vector $c_t$ included in each encrypted tag $ET_x$.

More specifically, the search device 500 searches for an encrypted tag $ET_x$ corresponding to the search key $TD_v$ by calculating an inner product of the search vector $k^*_t$ included in the search key $TD_v$ and the tag vector $c_t$ which is included in each encrypted tag $ET_x$ and which corresponds to the search vector $k^*_t$.

As described with reference to FIG. 5, the partial match secret search can be implemented by calculating the inner product by shifting the index t of the search vector $k^*_t$ included in the search key $TD_v$ one by one. The update of the index t is a simple index replacement. Therefore, the update does not require special search key conversion processing, and the update is fast. Meanwhile, as described with reference to FIG. 6 or FIG. 7, it is not possible to perform the search after separating or replacing the search character string, and an unintended search by a malicious third party can be prevented.

In the above description, users who can perform the search are not restricted, and all users can search for all encrypted tags $ET_x$. However, like in Patent Literature 2, for each encrypted tag $ET_x$, it is possible to restrict the users who can perform the search by combining the above-mentioned partial match secret search scheme with the inner-product predicate encryption method.

<Hardware Configuration of Secret Search System According to First Embodiment>

Next, a hardware configuration example of the secret search system 10 according to the first embodiment is described with reference to FIG. 17. As described above, the secret detection system according to the first embodiment includes the key generation device 100, the encrypted tag generation device 200, the search key generation device 300, and the search device 500.

The key generation device 100, the encrypted tag generation device 200, the search key generation device 300, and the search device 500 are composed of, for example, a computer.

The key generation device 100, the encrypted tag generation device 200, the search key generation device 300, and the search device 500 include hardware, for example, a processor 901, an auxiliary storage device 902, a memory 903, a communication device 904, an input interface 905, and a display interface 906.

The processor 901 is connected to other pieces of hardware via a signal line 910, and is configured to control those other pieces of hardware.

The input interface 905 is connected to an input device 907 by a cable 911.

The display interface 906 is connected to a display 908 by a cable 912.

The processor 901 is an integrated circuit configured to perform processing. The processor 901 is, for example, a central processing unit (CPU), a digital signal processor (DSP), or a graphics processing unit (GPU).

The auxiliary storage device 902 is, for example, a read only memory (ROM), a flash memory, or a hard disk drive (HDD).

The memory 903 is, for example, a random access memory (RAM).

The communication device 904 includes a receiver 9041 configured to receive data and a transmitter 9042 configured to transmit data. The communication device 904 is, for example, a communication chip or a network interface card (NIC).

The input interface 905 is a port to which the cable 911 of the input device 907 is to be connected. The input interface 905 is, for example, a universal serial bus (USB) terminal.

The display interface 906 is a port to which the cable 912 of the display 908 is to be connected. The display interface 906 is, for example, a USB terminal or a high-definition multimedia interface (HDMI) (trademark) terminal.

The input device 907 is, for example, a mouse, a keyboard, or a touch panel.

The display 908 is, for example, a liquid crystal display (LCD).

The auxiliary storage device 902 is configured to store programs for implementing the above-mentioned information acquisition unit 110, base generation unit 120, key generation unit 140, key output unit 150, information acquisition unit 210, tag generation unit 220, random number generation unit 221, element generation unit 222, encrypted tag output unit 230, information acquisition unit 310, key generation unit 320, random number generation unit 321, secret value generation unit 322, element generation unit 323, key output unit 330, information acquisition unit 510, search determination unit 520, and result output unit 530. In the following, the information acquisition unit 110, the base generation unit 120, the key generation unit 140, the key output unit 150, the information acquisition unit 210, the tag generation unit 220, the random number generation unit 221, the element generation unit 222, the encrypted tag output unit 230, the information acquisition unit 310, the key generation unit 320, the random number generation unit 321, the secret value generation unit 322, the element generation unit 323, the key output unit 330, the information acquisition unit 510, the search determination unit 520, and the result output unit 530 are collectively referred to as "each of the units."

Those programs are loaded onto the memory 903, read by the processor 901, and executed by the processor 901.

Further, the auxiliary storage device 902 also stores an operating system (OS).

Then, at least a part of the OS is loaded onto the memory 903, and the processor 901 executes the programs for implementing the function of "each of the units" while executing the OS.

In FIG. 17, one processor 901 is illustrated, but the key generation device 100, the encrypted tag generation device 200, the search key generation device 300, the converted search key generation device 400, and the search device 500 may be composed of a plurality of processors 901. Moreover, a plurality of processors 901 may execute in a collaborative manner a program for implementing the function of "each of the units."

Further, information, data, a signal value, and a variable value indicating the result of processing executed by "each of the units" are stored into the memory 903, the auxiliary storage device 902, or a register or cache memory included in the processor 901 as files.

Further, "each of the units" may be provided as a "circuitry." Moreover, the term "unit" of "each of the units" maybe read as "circuit," "step," "procedure," or "processing." The "circuit" and "circuitry" are concepts that include not only the processor 901 but also other types of processing circuits such as a logic IC, a gate array (GA), an application-specific integrated circuit (ASIC), or a field-programmable gate array (FPGA).

REFERENCE SIGNS LIST 10 secret search system, 100 key generation device, 110 information acquisition unit, 120 base generation unit, 140 key generation unit, 150 key output unit, 200 encrypted tag generation device, 210 information acquisition unit, 220 tag generation unit, 221 random number generation unit, 222 element generation unit, 230 encrypted tag output unit, 300 search key generation device, 310 information acquisition unit, 320 key generation unit, 321 random number generation unit, 322 secret value generation unit, 323 element generation unit, 330 key output unit, 500 search device, 510 information acquisition unit, 520 search determination unit, 530 result output unit, pk public key, sk secret key, B, B* base, B^, B^* partial base, param parameter, Ix, Iv set of indices, $\vec{x}$ attribute vector, $\vec{v}$ predicate vector, k* search vector, $ET_x$ encrypted tag, $TD_v$ search key

The invention claimed is:

1. A secret search system, comprising:
 a memory;
 a search key engine configured to generate a search key $TD_v$ in which a position of each character of a search character string is specified and set;
 an encrypted tag engine configured to generate encrypted tags $ET_x$ in which a position of each character of a character-string-to-be-searched is specified and set; and
 a search engine configured to search for, from among the encrypted tags $ET_x$, an encrypted tag $ET_x$ corresponding to the search key $TD_v$,
 wherein one of the following applies,
  an index t indicating the position of each character is set in an element included in the search key $TD_v$ and an index −t is set in an element included in the encrypted tags $ET_x$; and
  the index −t is set in the element included in the search key $TD_v$ and the index t is set in the element included in the encrypted tags $ET_x$,
 wherein the index −t has a sign obtained by inverting a sign of the index t, and
 wherein the secret search system is configured to search for the encrypted tag $ET_x$ corresponding to the search key $TD_v$ by, during the search, adding the index t and the index −t set in the search key $TD_v$ and the encrypted tags $ET_x$ to cancel out the index t and the index −t.

2. The secret search system according to claim 1, wherein the search engine is configured to search for the encrypted tag corresponding to the search key $TD_v$ by using an inner-product predicate encryption method for calculating an inner product of the element included in the search key $TD_v$ and the element included in the encrypted tags $ET_x$.

3. The secret search system according to claim 1,
 wherein the search engine is configured to perform a search by using a secret value $s_0$, a first variance $s_t$ for each index t of t∈Iv, and a second variance $\tau_t$ for each index t of t∈Iv,
 wherein the secret value $s_0$ and the first variance $s_t$ satisfy a relationship of $s_0 = \Sigma_{t \in Iv} s_t$,
 wherein the second variance Tt satisfies a relationship of $0 = \Sigma_{t \in Iv} \tau_t$, and
 wherein the Iv is a set of the indices t.

4. The secret search system according to claim 3, wherein the search key $TD_v$ includes:
 an element $k^*_0$ which is a vector in a base $B^*_0$ in which the secret value $s_0$ is set; and
 for each index t of t∈Iv, an element $k^*_t$ which is a vector in a base $B^*$ in which the first variance $s_t$, the second variance $\tau_t$, an attribute value $v_t$, and the index t are set.

5. The secret search system according to claim 4,
 wherein the encrypted tag $ET_x$ includes:
  an element $c_0$ which is a vector in a base $B_0$ corresponding to the base $B^*_0$; and
  for each index t of t∈Ix, an element $c_t$ which is a vector in a base B corresponding to the base $B^*$ in which an attribute value $x_t$ and the index −t are set, and
 wherein the Ix is a set of the indices t.

6. The secret search system according to claim 2,
 wherein the search engine is configured to perform a search by using a secret value $s_0$, a first variance $s_t$ for each index t of t∈Iv, and a second variance $\tau_t$ for each index t of t∈Iv,
 wherein the secret value $s_0$ and the first variance $s_t$ satisfy a relationship of $s_0 = \Sigma_{t \in Iv} s_t$,
 wherein the second variance $\tau_t$ satisfies a relationship of $0 = \Sigma_{t \in Iv} \tau_t$, and
 wherein the Iv is a set of the indices t.

7. The secret search system according to claim 6, wherein the search key $TD_v$ includes:
 an element $k^*_0$ which is a vector in a base $B^*_0$ in which the secret value $s_0$ is set; and
 for each index t of t∈Iv, an element $k^*_t$ which is a vector in a base $B^*$ in which the first variance $s_t$, the second variance $\tau_t$, an attribute value $v_t$, and the index t are set.

8. The secret search system according to claim 7,
 wherein the encrypted tag $ET_x$ includes:
  an element $c_0$ which is a vector in a base $B_0$ corresponding to the base $B^*_0$; and for each index t of t∈Ix, an element $c_t$ which is a vector in a base B corresponding to the base B* in which an attribute value $x_t$ and the index −t are set, and wherein the Ix is a set of the indices t.

9. A secret search method, comprising:

generating a search key $TD_v$ in which a position of each character of a search character string is specified and set;

generating a plurality of encrypted tags $ET_x$ in which a position of each character of a character-string-to-be-searched is specified and set; and searching for, from among the plurality of encrypted tags $ET_x$, an encrypted tag $ET_x$ corresponding to the search key $TD_v$, wherein one of the following applies, an index t indicating the position of each character is set in an element included in the search key $TD_v$ and an index −t is set in an element included in the plurality of encrypted tags $ET_x$; and the index −t is set in the element included in the search key $TD_v$ and the index t is set in the element included in the plurality of encrypted tags $ET_x$, wherein the index −t has a sign obtained by inverting a sign of the index t, and wherein the encrypted tag $ET_x$ corresponding to the search key $TD_v$ is searched for by, during the search, adding the index t and the index −t set in the search key $TD_v$ and the plurality of encrypted tags $ET_x$ to cancel out the index t and the index −t.

\* \* \* \* \*